United States Patent
Choi (10) Patent No.: US 8,528,051 B2
(45) Date of Patent: Sep. 3, 2013

(54) MOBILE TERMINAL, SERVER, AND METHOD FOR PROVIDING CONTENT INFORMATION

(75) Inventor: Sung Chul Choi, Seoul (KR)

(73) Assignee: Pantech Co., Ltd., Seoul (KR)

( * ) Notice: Subject to any disclaimer, the term of this patent is extended or adjusted under 35 U.S.C. 154(b) by 77 days.

(21) Appl. No.: 13/118,770

(22) Filed: May 31, 2011

(65) Prior Publication Data

US 2012/0167175 A1 Jun. 28, 2012

(30) Foreign Application Priority Data

Dec. 24, 2010 (KR) ........................ 10-2010-0134362

(51) Int. Cl.
*H04L 29/00* (2006.01)
(52) U.S. Cl.
USPC ............................................................. 726/3
(58) Field of Classification Search
USPC ........................................... 726/3; 380/272
See application file for complete search history.

(56) References Cited

U.S. PATENT DOCUMENTS

| 2008/0182558 A1* | 7/2008 | Rhee ........................... 455/412.1 |
| 2008/0259885 A1* | 10/2008 | Faulkner et al. .............. 370/338 |
| 2012/0106514 A1* | 5/2012 | Zheng et al. ................... 370/331 |

FOREIGN PATENT DOCUMENTS

| JP | 2004-088440 | 3/2004 |
| KR | 10-0628566 | 9/2006 |
| KR | 10-2009-0000204 | 1/2009 |
| KR | 10-2010-0054187 | 5/2010 |

* cited by examiner

*Primary Examiner* — Matthew Smithers
(74) *Attorney, Agent, or Firm* — H.C. Park & Associates, PLC (57) ABSTRACT

A mobile terminal includes a communication unit to perform Wi-Fi communication in a Wi-Fi zone of an access point, an authentication unit to perform or request authentication using Media Access Control (MAC) address information of the mobile terminal if the mobile terminal enters the Wi-Fi zone, and a control unit to receive content information allowed according to the authentication result through the communication unit when the mobile terminal is authenticated by the authentication unit.

18 Claims, 5 Drawing Sheets

MOBILE TERMINAL, SERVER, AND METHOD FOR PROVIDING CONTENT INFORMATION

CROSS-REFERENCE TO RELATED APPLICATION

This application claims priority from and the benefit of Korean Patent Application No. 10-2010-0134362, filed on Dec. 24, 2010, which is hereby incorporated by reference for all purposes as if fully set forth herein.

BACKGROUND

1. Field

The present disclosure relates to a mobile terminal, a server, and a method for providing content information, and more specifically, to a mobile terminal to receive content information using a Media Access Control (MAC) address, a server to output content information using the MAC address, and a method for providing content information.

2. Discussion of the Background

An Internet access point (AP) using a Wi-Fi technique may provide wireless Internet access to a mobile communication terminal. If a user's mobile terminal makes a request for Wi-Fi Internet access, the AP may perform authentication to allow the Internet access. A network key sharing scheme such as a Wi-Fi Protected Access-pre shared key (WPA-PSK) scheme defined in the WEP 802.11 may be used as an authentication scheme.

SUMMARY

Exemplary embodiments of the present invention provide a mobile terminal to receive content information using a Media Access Control (MAC) address. Exemplary embodiments of the present invention also provide a server to output content information using the MAC address. Exemplary embodiments of the present invention also provide a method for providing content information using the MAC address.

Additional features of the invention will be set forth in the description which follows, and in part will be apparent from the description, or may be learned by practice of the invention.

An exemplary embodiment of the present invention discloses a mobile terminal including a communication unit to perform Wi-Fi communication in a Wi-Fi zone of an access point, an authentication unit to request authentication using MAC address information of the mobile terminal if the mobile terminal enters the Wi-Fi zone, and a control unit to receive content information allowed according to an authentication result received through the communication unit if the mobile terminal is authenticated by the authentication unit.

An exemplary embodiment of the present invention discloses a mobile terminal including a communication unit to perform Wi-Fi communication using an access point device included in the mobile terminal, an authentication unit to receive MAC address information of another mobile terminal and to perform authentication if the other mobile terminal enters a Wi-Fi zone associated with the access point device, and a control unit to provide content information allowed according to the authentication result through the communication unit to the other mobile terminal if the other mobile terminal is authenticated by the authentication unit.

An exemplary embodiment of the present invention discloses a server including a communication unit to perform Wi-Fi communication with a mobile terminal, an authentication unit to store a MAC address range and to perform authentication of the mobile terminal using MAC address information of the mobile terminal if the mobile terminal enters a Wi-Fi zone of an access point associated with the server, and a control unit to transmit content information allowed according to the authentication result to the authenticated mobile terminal through the communication unit if the mobile terminal is authenticated by the authentication unit.

An exemplary embodiment of the present invention discloses a method for providing content information including transmitting MAC address information of a mobile terminal to an access point device or to a server through Wi-Fi communication if the mobile terminal enters a Wi-Fi zone, performing authentication using the MAC address information in the access point device or the server, and transmitting content information allowed according to the authentication result from the server to the mobile terminal if the mobile terminal is authenticated.

An exemplary embodiment of the present invention discloses a method for providing content information including receiving Media Access Control (MAC) address information of a first mobile terminal through Wi-Fi communication using an access point device included in a second mobile terminal if the first mobile terminal enters a Wi-Fi zone, performing authentication using the MAC address information in the second mobile terminal, and transmitting content information allowed according to the authentication result to the first mobile terminal if the first mobile terminal is authenticated.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

Figure 1:
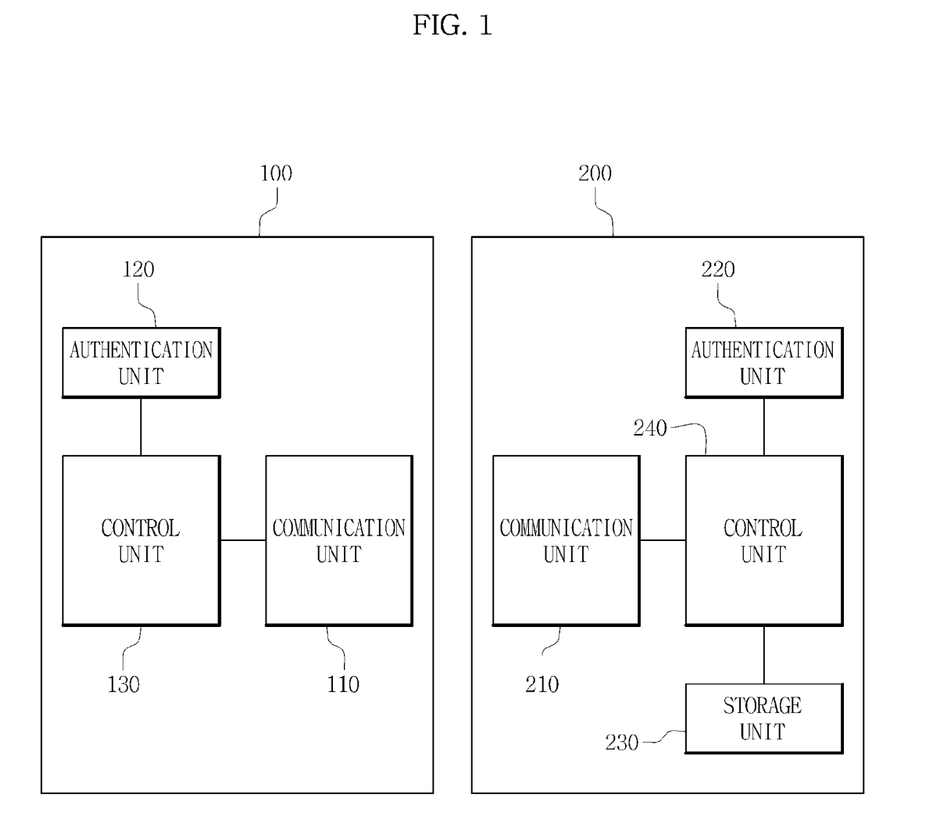
FIG. 1 is a diagram showing the configurations of a mobile terminal and a server according to exemplary embodiments.

FIG. 1 is a diagram showing the configurations of a mobile terminal and a server according to exemplary embodiments.

Referring to FIG. 1, a mobile terminal 100 includes a communication unit 110, an authentication unit 120, and a control unit 130. A server 200 includes a communication unit 210, an authentication unit 220, a storage unit 230, and a control unit 240.

The mobile terminal 100 may perform a client function of receiving and outputting content information as a result of authentication, where the authentication is obtained by transmitting Media Access Control (MAC) address information of the mobile terminal 100 to an AP device, a server, or to another mobile terminal performing an AP function. The mobile terminal 100 also may perform the AP function of providing content information as a result of authenticating another mobile terminal using the other mobile terminal's MAC address.

The communication unit 110 of the mobile terminal 100 performs Wi-Fi communication in a Wi-Fi zone of an AP. Specifically, a mobile terminal 100 that enters a Wi-Fi zone, or a device performing an AP function, may detect a Wi-Fi signal of the Wi-Fi zone, transmit a MAC address of the mobile terminal 100 through Wi-Fi communication, and receive content information.

The term "Wi-Fi" refers to the mobile communication technique standard of a local area network (LAN) capable of accessing the high-speed Internet within a range of an AP, which is a wireless access device. The AP may be a fixed AP using a dedicated AP device, or may be a mobile AP using an AP mounted in a mobile terminal.

Since the AP provides a Wi-Fi Internet service to a mobile terminal of a user who joins an Internet Protocol (IP) via a LAN, a spatial range for providing an Internet service with signal intensity of one AP may be limited. The range of the AP may be specified as a Wi-Fi zone. For extension of the range of the Wi-Fi zone, one or more AP devices may be provided.

Returning to FIG. 1, the authentication unit 120 of the mobile terminal 100 requests or performs authentication using the MAC address information of the mobile terminal 100 if and when the mobile terminal 100 enters the Wi-Fi zone. Specifically, if the mobile terminal 100 performs authentication through a fixed AP while performing the client function, the authentication unit 120 transmits the MAC address of the mobile terminal 100 to the fixed AP device to request authentication, and performs authentication through the fixed AP device, which may perform the authentication alone or through a server or another mobile terminal. If the mobile terminal 100 performs authentication of another mobile device by performing the mobile AP function, the MAC address information of the other mobile terminal is received by the mobile terminal 100 and authentication may be performed by the authentication unit 120 through a fixed AP or through communication with the server 200.

The mobile terminal 100 may further include a storage unit (not shown) to store a MAC address range. If the mobile terminal 100 has an AP device function and performs authentication, authentication may be performed depending on whether the received MAC address information for another mobile terminal is included in the MAC address range stored in the storage unit.

The MAC address refers to an address assigned to a device for communication. The device connected to a network may have a MAC address consisting of 12 hexadecimal digits, i.e. 48 bits. The mobile terminal 100 connected to the network is also assigned a MAC address.

If the MAC address has 12 digits, first six digits may be an Organizationally Unique Identifier (OUI) for identifying a manufacturer of the mobile device 100. The remaining six digits of the MAC address are a host identifier (HI) for identifying a product of the manufacturer. Accordingly, the manufacturer of the mobile terminal 100 may be identified by the OUI included in the MAC address of the mobile terminal 100, and the product may be identified by the HI.

As a result, the MAC address range corresponding to the manufacturer or the MAC address range corresponding to the product may be specified and stored without requiring an additional registration procedure. A specific mobile terminal may be selected depending on whether the MAC address information of the mobile terminal to be authenticated is in the MAC address range, and a restricted Internet service may be provided to the selected mobile terminal.

When the mobile terminal 100 having the MAC address information is authenticated by the authentication unit 120, the control unit 130 of the mobile terminal 100 receives content information allowed according to the authentication result, or transmits allowed content information through the communication unit 110.

The content information may include information about a certain manufacturer or a certain product having predetermined MAC address information. The mobile terminal 100 may be selected using the MAC address information, and specific content information may be controlled to be output. The content information may be, for example, an advertisement or an event signal.

The server 200 receives information about the mobile terminal 100 or the AP device, makes a request for Internet access, detects a Wi-Fi signal of a mobile terminal 100 entering a Wi-Fi zone of the AP through the communication unit 210, and performs Wi-Fi communication with the mobile terminal 100.

The authentication unit 220 of the server 200 may store a certain MAC address range and performs authentication of the mobile terminal 100 depending on whether the MAC address information of the mobile terminal 100 is included in the stored MAC address range. The MAC address range stored in the authentication unit 220 may be changed by a user setting.

The storage unit 230 stores a transmission history of the content information transmitted to the mobile terminal 100. The storage unit 230 of the server 200 may store the certain MAC address range.

When the mobile terminal 100 having the specific MAC address information is authenticated by the authentication unit 220 in the AP device or the server 200, the control unit 240 transmits content information allowed according to the authentication result to the authenticated mobile terminal 100 through the communication unit 210.

The control unit 240 may correct and store one or more pieces of MAC address information previously stored in the authentication unit 220 or storage unit 230 according to a user instruction and may manage the mobile terminal 100 to which the content information will be transmitted.

Specifically, the server 200 may perform management of the mobile terminal 100, such as storing the IP address of the managed AP device and updating the MAC address information stored in the fixed AP device through firmware such that authentication is performed using the changed MAC address in the fixed AP device, or may perform management of the mobile terminal 100, such as receiving the MAC address information from a mobile terminal having an AP function, determining whether the MAC address information of the mobile terminal is included in the stored MAC address range, performing authentication if the MAC address information of the mobile terminal is included in the stored MAC address range, and transmitting content information.

The control unit 240 may decide and manage the content information to be transmitted to the mobile terminal 100 based on the history stored in the storage unit 230. For example, it may prevent the same content information from being transmitted to a mobile terminal 100 more than once.

Figure 2A:
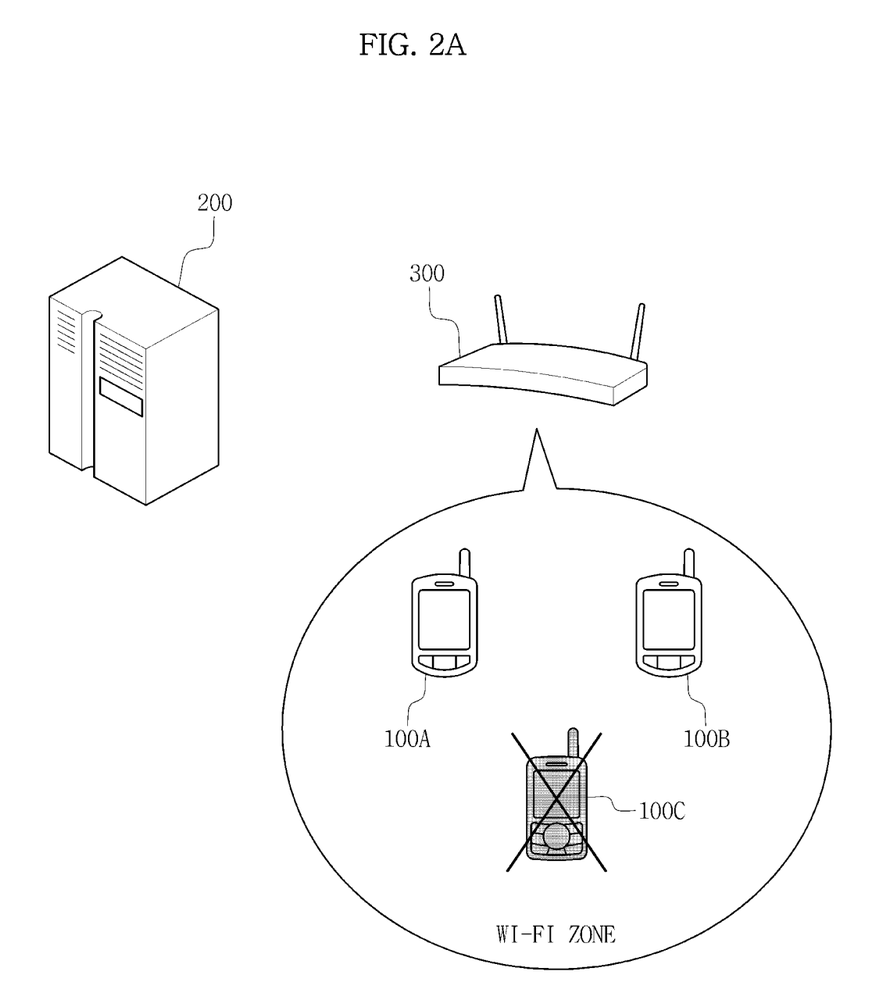
FIG. 2A and FIG. 2B are diagrams showing communication using a fixed access point and a mobile access point, respectively, according to exemplary embodiments.
Figure 2B:
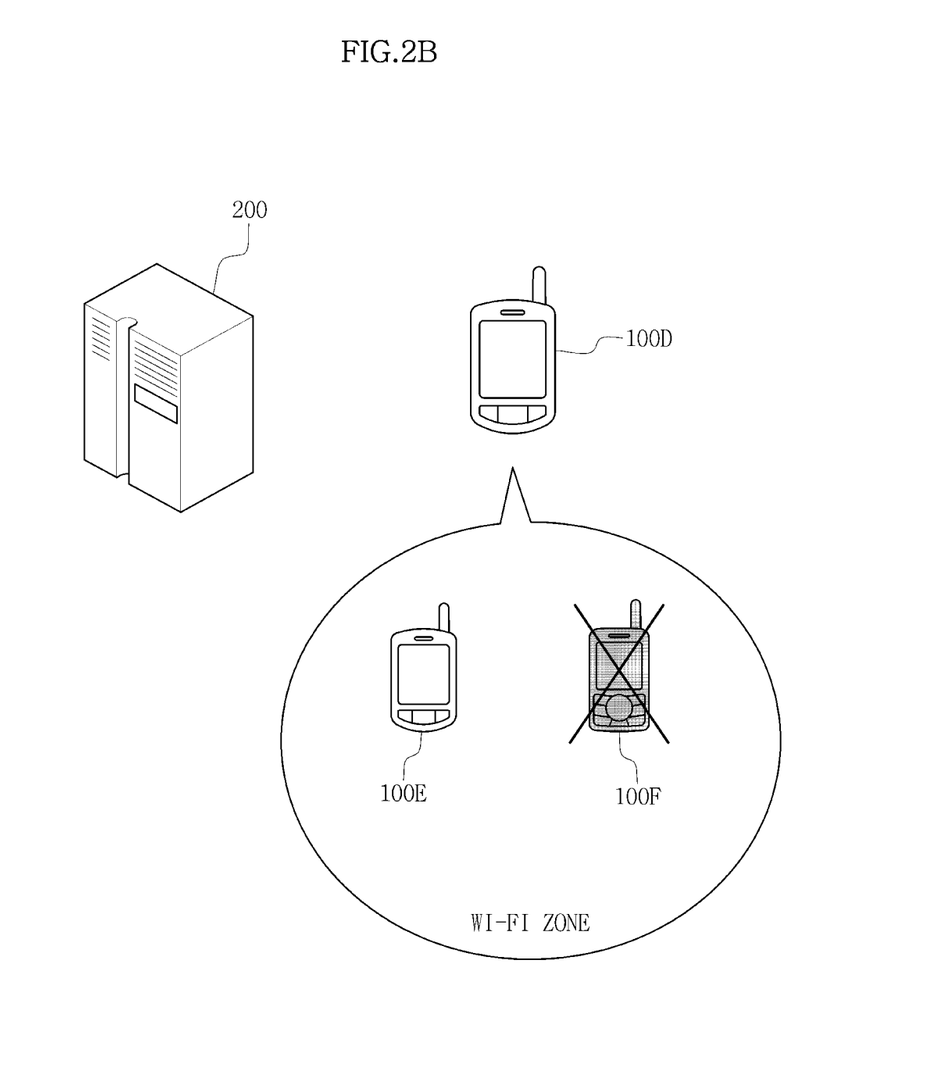

FIG. 2A and FIG. 2B are diagrams showing communication using a fixed AP and a mobile AP, respectively, according to exemplary embodiments.

More specifically, FIG. 2A shows a server 200, an AP device 300, and mobile terminals 100A, 100B, and 100C in the case of performing authentication in the fixed AP device. And more specifically, FIG. 2B shows a server 200 and a mobile terminal 100D in the case of performing authentication using the mobile terminal 100D having an AP function.

Referring to FIG. 2A, a first mobile terminal 100A, a second mobile terminal 100B, a third mobile terminal 100C, a server 200, and an AP device 300 are shown. If the first mobile terminal 100A enters a Wi-Fi zone of the AP device 300, the AP device 300 detects a Wi-Fi signal of the first mobile terminal 100A and performs authentication.

The first mobile terminal 100A transmits its MAC address information to the AP device 300, and the AP device 300 checks whether the MAC address information of the first mobile terminal 100A is included in the MAC address range stored in the AP device 300. Authentication may be performed depending on whether the MAC address information of the first mobile terminal 100A is included in the MAC address range stored in the AP device 300. If the first mobile terminal 100A is authenticated, the server 200 transmits content information to the first mobile terminal 100A, and the first mobile terminal 100A provides the received content information to the user.

When the MAC address information of the second mobile terminal 100B coincides with the MAC address range stored in the AP device 300, the second mobile terminal may receive and provide content information in the same manner as described above. In this example, the third mobile terminal 100C has MAC address information that is not included in the MAC address range stored in the AP device 300. As such, authentication of the third mobile terminal 100C fails and access of the third mobile terminal 100C to the server 200 or the AP device 300 is not allowed.

Referring to FIG. 2B, a fourth mobile terminal 100D, a fifth mobile terminal 100E, a sixth mobile terminal 100F, and a server 200 are shown. The fourth mobile terminal 100D has an AP function. If the fifth mobile terminal 100 enters a Wi-Fi zone of the AP, the fourth mobile terminal 100D detects a Wi-Fi signal of the fifth mobile terminal 100E and performs authentication.

Specifically, the fourth mobile terminal 100D receives the MAC address information of the fifth mobile terminal 100E, transmits the received MAC address information to the server 200, and performs authentication through the server 200. If the MAC address information of the fifth mobile terminal 100E is included in the MAC address range stored in the server 200, the authentication is performed. As such, the fourth mobile terminal 100D transmits content information received from the server to the fifth mobile terminal 100E to provide the content information to a user.

In this example, the MAC address information of the sixth mobile terminal 100F is not included in the MAC address range stored in the server 200. Thus, the authentication of the sixth mobile terminal 100F fails, and access of the sixth mobile terminal 100F to the server 200 is not allowed. The fourth mobile terminal 100D may also perform authentication using another mobile terminal (not shown) having an AP function, receive content information from the server, and provide the content information to a user.

Figure 3A:
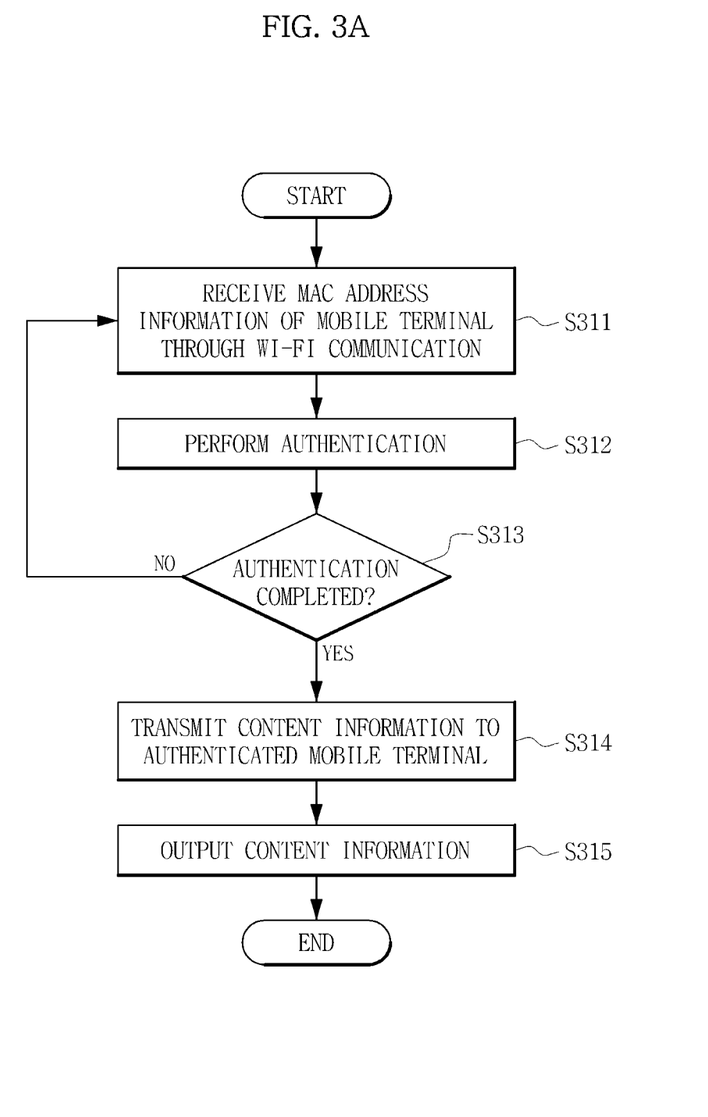
FIG. 3A and FIG. 3B are diagrams illustrating methods for providing content information according to exemplary embodiments.
Figure 3B:
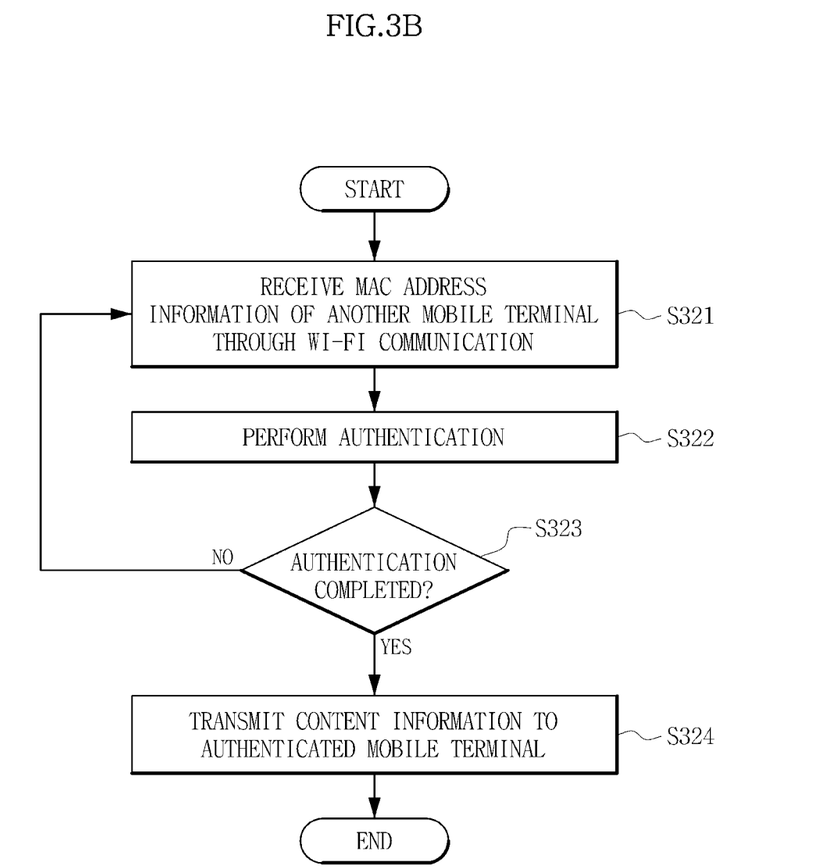

FIG. 3A and FIG. 3B are diagrams illustrating methods for providing content information according to exemplary embodiments.

More specifically, FIG. 3A illustrates a method for performing authentication and providing content information in an AP device. And more specifically, FIG. 3B shows a method for performing authentication and providing content information through a mobile terminal having an AP function.

Referring to FIG. 3A, if a mobile terminal enters a Wi-Fi zone, MAC address information of the mobile terminal is transmitted to an AP device or to a server through a mobile terminal having an AP function through Wi-Fi communication (S311). Then, the AP device or the server which receives the MAC address information performs authentication using the MAC address information of the mobile terminal (S312).

If the authentication of the mobile terminal is completed (S313), the server or AP device transmits content information allowed according to the authentication result to the mobile terminal (S314), and the mobile terminal outputs the received content information (S315). Alternatively, if the authentication of the mobile terminal is not completed at S313, the server or AP device does not transmit content information to the mobile terminal. As a result, the mobile terminal may return to step 311 and retransmit MAC address information, or may end the process without receiving the content information.

Referring to FIG. 3B, if a certain mobile terminal enters a Wi-Fi zone of a mobile terminal having an AP function, the mobile terminal having the AP function receives MAC address information of the certain mobile terminal through Wi-Fi communication (S321). Then, the mobile terminal having the AP function performs authentication using the MAC address information of the certain mobile terminal by communicating with the server (S322).

If the authentication of the certain mobile is completed (S323), the mobile terminal having the AP function transmits content information allowed according to the authentication result to the certain mobile terminal (S324). Alternatively, if the authentication of the certain mobile terminal is not completed at S323, the mobile terminal having the AP function does not transmit content information to the certain mobile terminal. As a result, the certain mobile terminal may return to step 311 and retransmit MAC address information, or may end the process without receiving the content information.

Since a user may know the MAC address information of a specific mobile terminal in advance, the user may transmit content information corresponding to an advertisement or an event for the specific mobile terminal through a fixed AP or mobile AP.

Applications of the exemplary embodiments may include for example, without limitation, a specific mobile terminal entering a Wi-Fi zone of a shopping mall. In that case, it is possible to provide a coupon that can be used in the shopping mall to the mobile terminal, or to perform an event such as Wi-Fi zone search in an unspecified area. In addition, it is possible to recognize a specific mobile terminal entering a zone such as a service center and to automatically provide content information such as a waiting number ticket.

A Wi-Fi zone may be configured in the unit of buildings or floors of a building to allow local commercial management. A service provider may access a homepage of a server and continuously or regularly manage advertisements or an event such as a coupon. It is possible to identify a mobile terminal corresponding to a specific model manufactured by a certain manufacturer using the MAC address information to provide a differentiated service. In addition, it is possible to transmit content information to another mobile terminal connected to a mobile terminal having an AP function.

The mobile terminal, the server, and the method for providing information according to the present disclosure are not limited to the above-described exemplary embodiments. Also, all or parts of the embodiments may be combined or modified without departing from the spirit and scope of the present disclosure.

With the mobile terminal, the server, and the method for providing information using the mobile terminal, server, or mobile terminal and server according to the disclosure, it is possible to provide content information to a user using the MAC address information resources through Wi-Fi communication without an additional registration procedure, and to enable a manufacturer of the mobile terminal to provide content information such as an advertisement to a specific mobile terminal, and to provide content information to a mobile terminal in a restricted zone, without requiring a complicated procedure.

While the exemplary embodiments have been shown and described, it will be understood by those skilled in the art that various changes in form and details may be made thereto without departing from the spirit and scope of the present disclosure as defined by the appended claims and their equivalents.

In addition, many modifications can be made to adapt a particular situation or material to the teachings of the present disclosure without departing from the essential scope thereof. Therefore, it is intended that the present disclosure not be limited to the particular exemplary embodiments disclosed for carrying out the present disclosure, but that the present disclosure will include all embodiments falling within the scope of the appended claims and their equivalents.

What is claimed is:

1. A mobile terminal, comprising:
   a communication unit to perform Wi-Fi communication in a Wi-Fi zone of an access point;
   an authentication unit to request authentication using Media Access Control (MAC) address information of the mobile terminal if the mobile terminal enters the Wi-Fi zone, wherein the authentication of the mobile terminal is based on if the MAC address information of the mobile terminal is included in a stored MAC address range of at least one of an access point device or a server; and
   a control unit to receive content information allowed according to an authentication result received through the communication unit if the mobile terminal is authenticated.

2. The mobile terminal according to claim 1, wherein the MAC address range corresponds to a manufacturer of the mobile terminal or identification information of the mobile terminal.

3. The mobile terminal according to claim 1, wherein the authentication unit transmits the MAC address information of the mobile terminal to another mobile terminal and performs the authentication through the other mobile terminal, and the control unit receives the content information allowed according to the authentication result from the other mobile terminal.

4. A mobile terminal, comprising:
   a communication unit to perform Wi-Fi communication using an access point device included in the mobile terminal;
   an authentication unit to receive Media Access Control (MAC) address information of another mobile terminal and to perform authentication if the other mobile terminal enters a Wi-Fi zone associated with the access point device, wherein the authentication of the other mobile terminal is based on if the MAC address information of the other mobile terminal is included in a stored MAC address range of the access point device; and
   a control unit to provide content information allowed according to an authentication result through the communication unit to the other mobile terminal if the other mobile terminal is authenticated.

5. The mobile terminal according to claim 4, wherein the MAC address range corresponds to a manufacturer of the mobile terminal or identification information of the mobile terminal.

6. The mobile terminal according to claim 4, further comprising a storage unit to store a MAC address range,
   wherein the authentication unit performs the authentication depending on whether the received MAC address information is included in the MAC address range stored in the storage unit.

7. A server, comprising:
   a communication unit to perform Wi-Fi communication with a mobile terminal;
   an authentication unit to store a Media Access Control (MAC) address range and to perform authentication of the mobile terminal using MAC address information of the mobile terminal if the mobile terminal enters a Wi-Fi zone of an access point associated with the server, wherein the authentication of the mobile terminal is based on if the MAC address information of the mobile terminal is included in the stored MAC address range; and
   a control unit to transmit content information allowed according to an authentication result to the authenticated mobile terminal through the communication unit if the mobile terminal is authenticated.

8. The server according to claim 7, wherein the control unit corrects and stores one or more pieces of MAC address information stored in the authentication unit according to a user instruction.

9. The server according to claim 7, further comprising a storage unit to store a history of the content information transmitted to the authenticated mobile terminal,
wherein the control unit transmits the content information according to the history stored in the storage unit.

10. The server according to claim 7, wherein the MAC address range corresponds to a manufacturer of the mobile terminal or identification information of the mobile terminal.

11. A method for providing content information, comprising:
transmitting Media Access Control (MAC) address information of a mobile terminal to an access point device or to a server through Wi-Fi communication if the mobile terminal enters a Wi-Fi zone;
performing authentication using the MAC address information in the access point device or the server, wherein the authentication of the mobile terminal is based on if the MAC address information of the mobile terminal is included in a stored MAC address range of at least one of the access point device or the server; and
transmitting content information allowed according to an authentication result from the server or the access point device to the mobile terminal if the mobile terminal is authenticated.

12. The method according to claim 11, wherein performing the authentication further comprises comparing the MAC address information with a previously stored MAC address range.

13. The method according to claim 11, further comprising outputting the content information.

14. The method according to claim 11, wherein the MAC address range corresponds to a manufacturer of the mobile terminal or identification information of the mobile terminal.

15. A method for providing content information, comprising:
receiving Media Access Control (MAC) address information of a first mobile terminal through Wi-Fi communication using an access point device included in a second mobile terminal if the first mobile terminal enters a Wi-Fi zone;
performing authentication using the MAC address information in the second mobile terminal, wherein the authentication of the first mobile terminal is based on if the MAC address information of the first mobile terminal is included in a stored MAC address range of the access point device; and
transmitting content information allowed according to an authentication result to the first mobile terminal if the first mobile terminal is authenticated.

16. The method according to claim 15, wherein performing the authentication further comprises comparing the MAC address information with a previously stored MAC address range.

17. The method according to claim 15, further comprising outputting the content information.

18. The method according to claim 15, wherein the MAC address range corresponds to a manufacturer of the mobile terminal or identification information of the mobile terminal.

\* \* \* \* \*